(12) United States Patent
Wang (10) Patent No.: US 8,831,634 B2
(45) Date of Patent: Sep. 9, 2014

(54) HELP-SEEKING METHOD, DEVICE AND SYSTEM BASED ON LOCATION BASED SERVICE

(71) Applicant: Huawei Technologies Co., Ltd., Shenzhen (CN)

(72) Inventor: Shouyu Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/731,967

(22) Filed: Dec. 31, 2012

(65) Prior Publication Data

US 2013/0172017 A1  Jul. 4, 2013

Related U.S. Application Data

(63) Continuation of application No. PCT/CN2011/080572, filed on Dec. 30, 2011.

(51) Int. Cl.
*H04W 24/00* (2009.01)
*H04M 11/04* (2006.01)

(52) U.S. Cl.
USPC ............. 455/456.1; 455/404.1; 455/404.2; 455/456.6

(58) Field of Classification Search
CPC ....... H04W 64/00; H04W 4/023; H04W 4/02; H04W 24/00; H04W 4/00; H04W 1/00; H04W 1/72536
USPC ............ 455/404.1–404.2, 418–420, 455/456.1–456.3, 456.5–456.6, 550.1, 455/556.2, 560–561, 410–411, 432.3, 455/433–434, 457; 701/408, 425–426, 701/515–517, 526; 340/539.1–539.13

See application file for complete search history.

(56) References Cited

U.S. PATENT DOCUMENTS

2006/0140382 A1 *  6/2006  Huey ...................... 379/220.01
2007/0282678 A1 * 12/2007  Dendi et al. .................... 705/14

(Continued)

FOREIGN PATENT DOCUMENTS

| CN | 101101330 A | 1/2008 |
| CN | 101547417 A | 9/2009 |
| CN | 101916417 A | 12/2010 |

OTHER PUBLICATIONS

International Search Report and Written Opinion of the International Searching Authority dated Oct. 25, 2012 in connection with International Patent Application No. PCT/CN2011/085072.

*Primary Examiner* — Meless Zewdu (57) ABSTRACT

Embodiments of the present invention disclose a help-seeking method, device and system based on a location based service, which relate to the field of location based service technologies. Help-seeking information sent by a first terminal is received, and a location area of the first terminal is determined according to the help-seeking information; the help-seeking information is sent to a second terminal located in the same location area as the first terminal; and response information fed back by the second terminal is received, and the response information is sent to the first terminal. The problem that, in the prior art, help-seeking information cannot be published in time when a user terminal needs help from another user terminal in the neighborhood of the user terminal in terms of geographic location is solved. The present invention may be applied in a mobile user terminal, for example, a smart phone terminal.

11 Claims, 6 Drawing Sheets

(56) References Cited

U.S. PATENT DOCUMENTS

| | | |
|---|---|---|
| 2009/0156185 A1 | 6/2009 | Morin |
| 2009/0233572 A1* | 9/2009 | Basir ........................... 455/404.1 |
| 2012/0005285 A1* | 1/2012 | Lin ............................... 709/206 |
| 2012/0077487 A1* | 3/2012 | Yang ........................... 455/432.1 |
| 2012/0171988 A1* | 7/2012 | Matsuo et al. ............. 455/404.2 |
| 2012/0246089 A1* | 9/2012 | Sikes ........................... 705/325 |
| 2012/0309424 A1* | 12/2012 | Xiao et al. .................. 455/456.3 |

\* cited by examiner

HELP-SEEKING METHOD, DEVICE AND SYSTEM BASED ON LOCATION BASED SERVICE

CROSS-REFERENCE TO RELATED APPLICATIONS

This application is a continuation application of International patent application No. PCT/CN2011/085072, filed Dec. 30, 2011 and entitled "HELP-SEEKING METHOD, DEVICE AND SYSTEM BASED ON LOCATION BASED SERVICE", which is incorporated herein by reference in its entirety.

TECHNICAL FIELD

The present invention relates to the field of location based service technologies, and in particular, to a help-seeking method, device and system based on a location based service.

BACKGROUND

A location based service (Location Based Service, LBS) is a type of service used to locate a user terminal and provide information related to a geographic location for the user terminal according to the geographic location of the user terminal. The LBS is in rapid development at present. The LBS functions mainly include the functions such as sign-in and making friends based on location. The sign-in function is that the user terminal records its own geographic location when reaching an interested spot in a city, and uploads the geographic location to a network server for sharing with net friends. The function of making friends based on location is that the user terminal searches for locations of other user terminals in the neighborhood of the user terminal in terms of geographic location, sends invitations to other user terminals, and conducts real-time chats.

During the implementation of the embodiments of the present invention, the inventor finds that the prior art at least has the following problem.

SUMMARY

Embodiments of the present invention provide a help-seeking method, device and system based on a location based service, which are capable of solving the problem that, in the prior art, help-seeking information cannot be published in time when a user terminal needs help from another user terminal in the neighborhood of the user terminal in terms of geographic location.

In order to achieve the foregoing object, the embodiments of the present invention adopt the following technical solutions.

A help-seeking method based on a location based service includes:

receiving help-seeking information sent by a first terminal, and determining a location area of the first terminal according to the help-seeking information sent by the first terminal;

sending the help-seeking information sent by the first terminal to a second terminal located in the same location area as the first terminal; and receiving response information corresponding to the help-seeking information and fed back by the second terminal, and sending the response information fed back by the second terminal to the first terminal.

A help-seeking method based on a location based service includes:

sending help-seeking information to a server so that the server determines a location area of a first terminal according to the help-seeking information and sends the help-seeking information to a second terminal located in the same location area as the first terminal; and after the second terminal feeds back response information corresponding to the help-seeking information to the server, receiving the response information fed back by the second terminal and sent by the server.

A server includes:

a first receiving unit, configured to receive help-seeking information sent by a first terminal;

a first location determining unit, configured to determine a location area of the first terminal according to the help-seeking information sent by the first terminal;

a first sending unit, configured to send the help-seeking information sent by the first terminal to a second terminal located in the same location area as the first terminal; and a first responding unit, configured to receive response information corresponding to the help-seeking information and fed back by the second terminal, and send the response information fed back by the second terminal to the first terminal.

A first terminal includes:

a second sending unit, configured to send help-seeking information to a server; and a third receiving unit, configured to, after a second terminal feeds back response information corresponding to the help-seeking information to the server, receive the response information fed back by the second terminal and sent by the server.

A help-seeking system based on a location based service includes the server, the first terminal and the second terminal described above, where the server is configured to receive help-seeking information sent by the first terminal, and determine a location area of the first terminal according to the help-seeking information sent by the first terminal; send the help-seeking information sent by the first terminal to the second terminal located in the same location area as the first terminal; and receive response information corresponding to the help-seeking information and fed back by the second terminal, and send the response information fed back by the second terminal to the first terminal; and the first terminal is configured to send the help-seeking information to the server; and after the second terminal feeds back the response information corresponding to the help-seeking information to the server, receive the response information fed back by the second terminal and sent by the server.

According to the help-seeking method, device and system based on the location based service provided in the embodiments of the present invention, help-seeking information of a first terminal is received, a location area of the first terminal is determined according to the help-seeking information, and the help-seeking information is sent to a second terminal located in the same location area as the first terminal. In this way, the help-seeking information sent by the first terminal can be published in time. Compared with the prior art, the embodiments of the present invention are capable of solving the problem that help-seeking information cannot be published in time when a user terminal needs help from another user terminal in the neighborhood of the user terminal in terms of geographic location.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these drawings without creative efforts.

DETAILED DESCRIPTION

The following clearly and completely describes the technical solutions according to the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

To make the advantages of the technical solutions of the present invention more comprehensible, the following describes the present invention in detail with reference to the accompanying drawings and embodiments.

Figure 1:
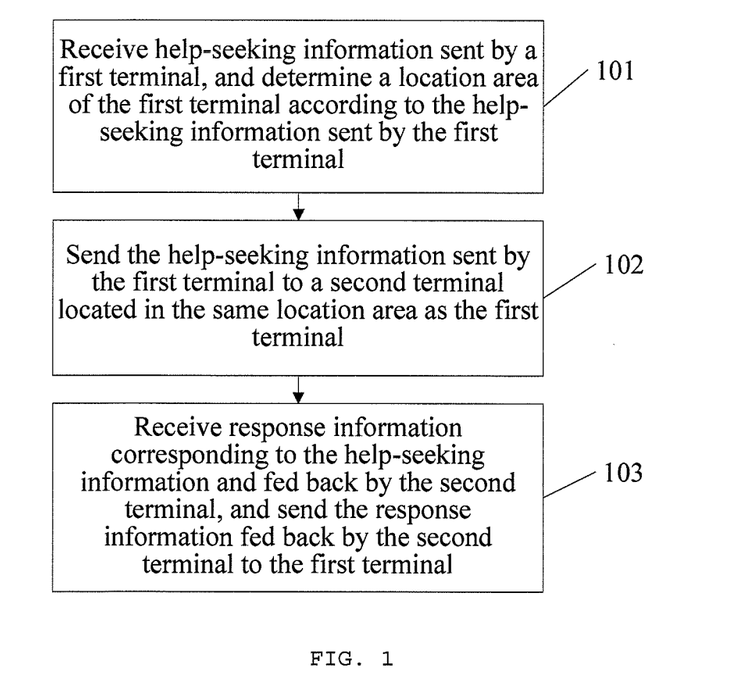
FIG. 1 is a flowchart of a help-seeking method based on a location based service according to an embodiment of the present invention.

As shown in FIG. 1, an embodiment of the present invention provides a help-seeking method based on a location based service. The method includes the following steps.

Step 101: Receive help-seeking information sent by a first terminal, and determine a location area of the first terminal according to the help-seeking information sent by the first terminal.

Step 102: Send the help-seeking information sent by the first terminal to a second terminal located in the same location area as the first terminal.

Step 103: Receive response information corresponding to the help-seeking information and fed back by the second terminal, and send the response information fed back by the second terminal to the first terminal.

The first terminal and the second terminal in the above steps may be the same terminal. The terminal may be a mobile phone, a personal digital assistant (Personal Digital Assistant, PDA for short), a handheld computer, a notebook, and a desktop computer, but is not limited thereto.

According to the help-seeking method based on the location based service provided in the embodiment of the present invention, help-seeking information of a first terminal is received, a location area of the first terminal is determined according to the help-seeking information, and the help-seeking information is sent to a second terminal located in the same location area as the first terminal. In this way, the help-seeking information sent by the first terminal can be published in time. Compared with the prior art, the embodiment of the present invention is capable of solving the problem that help-seeking information cannot be published in time when a user terminal needs help from another user terminal in the neighborhood of the user terminal in terms of geographic location.

Figure 2:
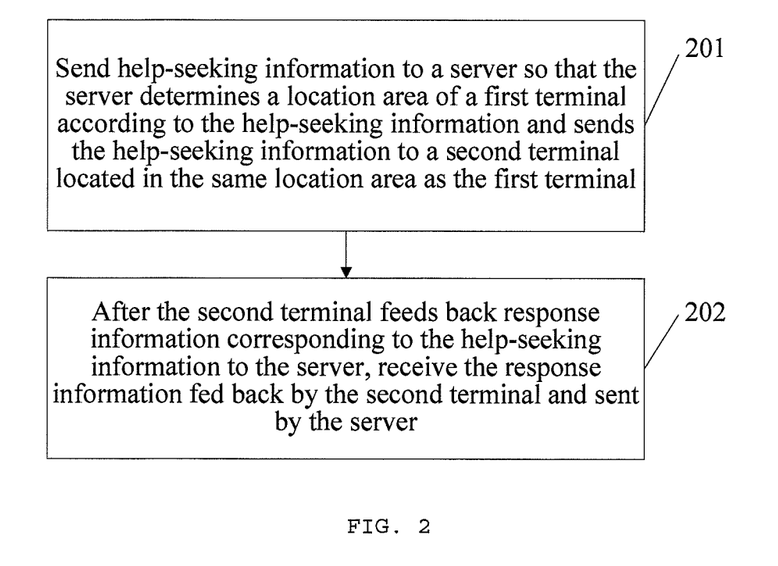
FIG. 2 is a flowchart of a help-seeking method based on a location based service according to another embodiment of the present invention.

As shown in FIG. 2, another embodiment of the present invention provides a help-seeking method based on a location based service. The method includes the following steps.

Step 201: Send help-seeking information to a server so that the server determines a location area of a first terminal according to the help-seeking information and sends the help-seeking information to a second terminal located in the same location area as the first terminal.

Step 202: After the second terminal feeds back response information corresponding to the help-seeking information to the server, receive the response information fed back by the second terminal and sent by the server.

The server in the above steps may be a service platform. The service platform includes a World Wide Web server, a location server and a Lightweight Directory Access Protocol (Lightweight Directory Access Protocol, LDAP) server, but is not limited thereto.

According to the help-seeking method based on the location based service provided in another embodiment of the present invention, help-seeking information is sent to a server so that the server obtains a location area of the first terminal according to the help-seeking information and sends the help-seeking information to a second terminal in the location area. In this way, the help-seeking information sent by the first terminal can be published in time. Compared with the prior art, the embodiment of the present invention is capable of solving the problem that help-seeking information cannot be published in time when a user terminal needs help from another user terminal in the neighborhood of the user terminal in terms of geographic location.

To make persons skilled in the art better understand the technical solutions of the present invention, the following specifically describes the embodiments of the present invention.

Figure 3:
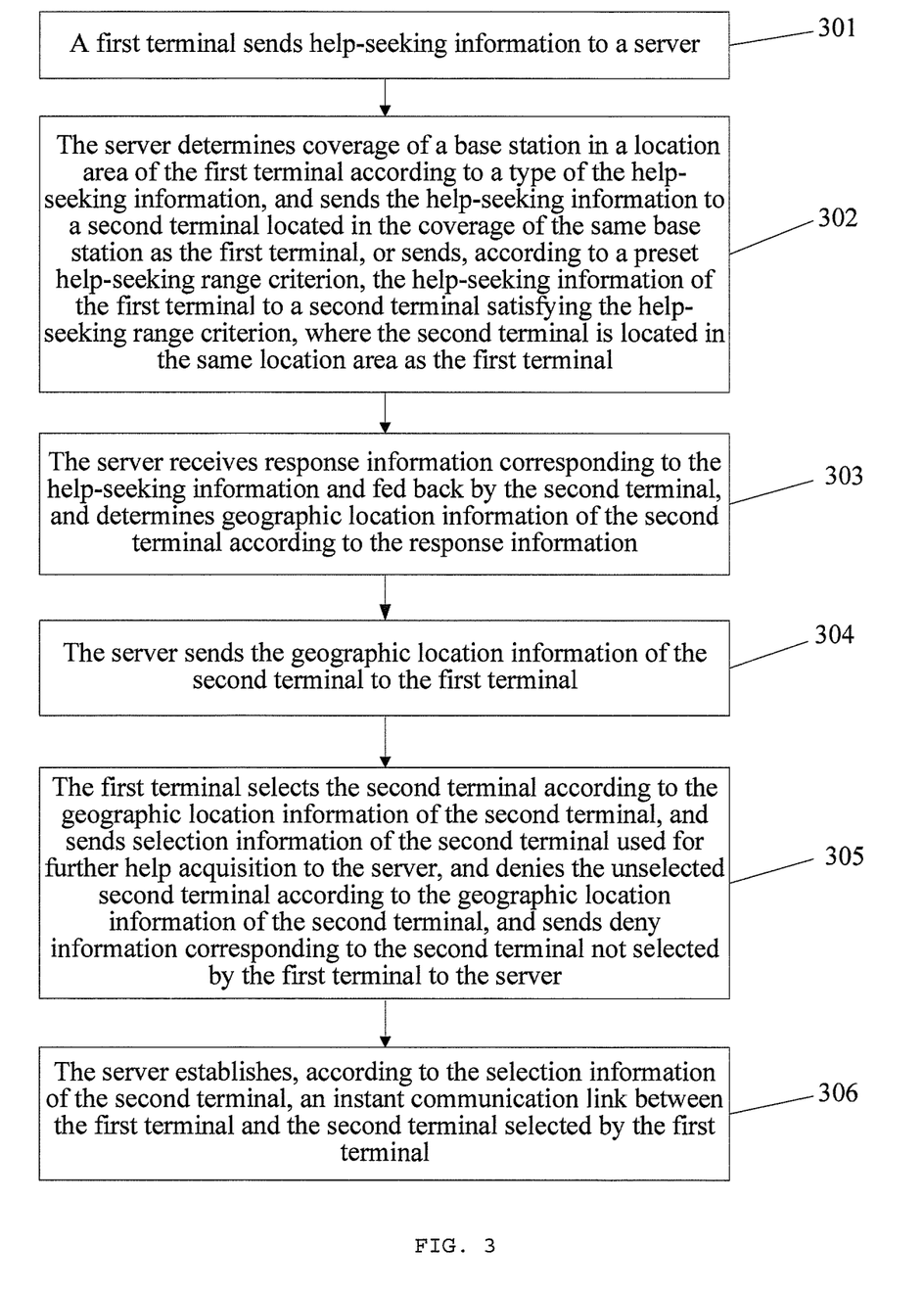
FIG. 3 is a flowchart of a help-seeking method based on a location based service according to still another embodiment of the present invention.

As shown in FIG. 3, still another embodiment of the present invention provides a help-seeking method based on a location based service. The method includes the following steps.

Step 301: A first terminal sends help-seeking information to a server.

The help-seeking information may be information such as "I am in Qiqi Restaurant, and want to borrow a membership card", but is not limited thereto.

Step 302: The server determines coverage of a base station in a location area of the first terminal according to a type of the help-seeking information, and sends the help-seeking information to a second terminal located in the coverage of the same base station as the first terminal, or sends, according to a preset help-seeking range criterion, the help-seeking information of the first terminal to a second terminal satisfying the help-seeking range criterion, where the second terminal is located in the same location area as the first terminal.

The determining the coverage of the base station in the location area of the first terminal according to the type of the help-seeking information may be, for example, limiting the coverage of the base station to a one-kilometer-radius area including the area of the first terminal if the help-seeking information is in a short-distance assistance type, for example, borrowing articles, query, or exchanging articles; and limiting the coverage of the base station to a five-kilometer-radius area including the area of the first terminal if the help-seeking information is in a remote assistance type, for example, emergency issues including breakdown of automobiles or getting lost. It should be noted that the above description is only a specific example of determining the coverage of the base station in the location area of the first terminal according to the type of the help-seeking information, which is, however, not limited thereto.

The help-seeking range criterion may be a preset distance, a preset group, or a preset distance and a preset group, for example, a preset distance such as a three-kilometer-radius area or a five-kilometer-radius area, a preset group such as friends or all people, or a combined range criterion of a preset distance and a preset group such as friends within a three-kilometer-radius area. However, the range criterion is not limited thereto. The help-seeking range criterion is preset in a help-seeking server or is contained in the help-seeking information of the first terminal.

Step 303: The server receives response information corresponding to the help-seeking information and fed back by the second terminal, and determines geographic location information of the second terminal according to the response information.

The geographic location information of the second terminal may be a specific location of the second terminal on a map, which is, however, not limited thereto.

Step 304: The server sends the geographic location information of the second terminal to the first terminal.

Step 305: The first terminal selects the second terminal according to the geographic location information of the second terminal, and sends selection information of the second terminal used for further help acquisition to the server, and denies the unselected second terminal according to the geographic location information of the second terminal, and sends deny information corresponding to the second terminal not selected by the first terminal to the server.

Specifically, a plurality of second terminals may exist, and the first terminal may filter the second terminals according to its own need. The filter criterion may be distance, location, and gender, which is, however, not limited thereto.

Further, when the first terminal filters the second terminals according to its own need, the first terminal may score the plurality of second terminals, and send the scores to the server, and the server records the scores of the plurality of second terminals and accumulates the scores to reach accumulated scores, so that when receiving the help-seeking information sent by the first terminal, the server takes precedence in sending, according to the accumulated scores of the plurality of second terminal in the server, the help-seeking information to the second terminal located in the same location area as the first terminal and having a higher accumulated score, which is, however, not limited thereto.

Step 306: The server establishes, according to the selection information of the second terminal, an instant communication link between the first terminal and the second terminal selected by the first terminal.

After the communication link is established successfully, the first terminal and the second terminal selected by the first terminal may communicate with each other in the modes of textual information and voice call, which is, however, not limited thereto.

According to the help-seeking method based on the location based service provided in still another embodiment of the present invention, a first terminal sends help-seeking information to a server; the server determines a location area of the first terminal according to the help-seeking information, and sends the help-seeking information to a second terminal in the location area, or sends, according to a preset help-seeking range criterion, the help-seeking information to a second terminal satisfying the help-seeking range criterion. In this way, the help-seeking information sent by the first terminal can be published in time. Compared with the prior art, the embodiment of the present invention is capable of solving the problem that help-seeking information cannot be published in time when a user terminal needs help from another user terminal in the neighborhood of the user terminal in terms of geographic location.

Figure 4:
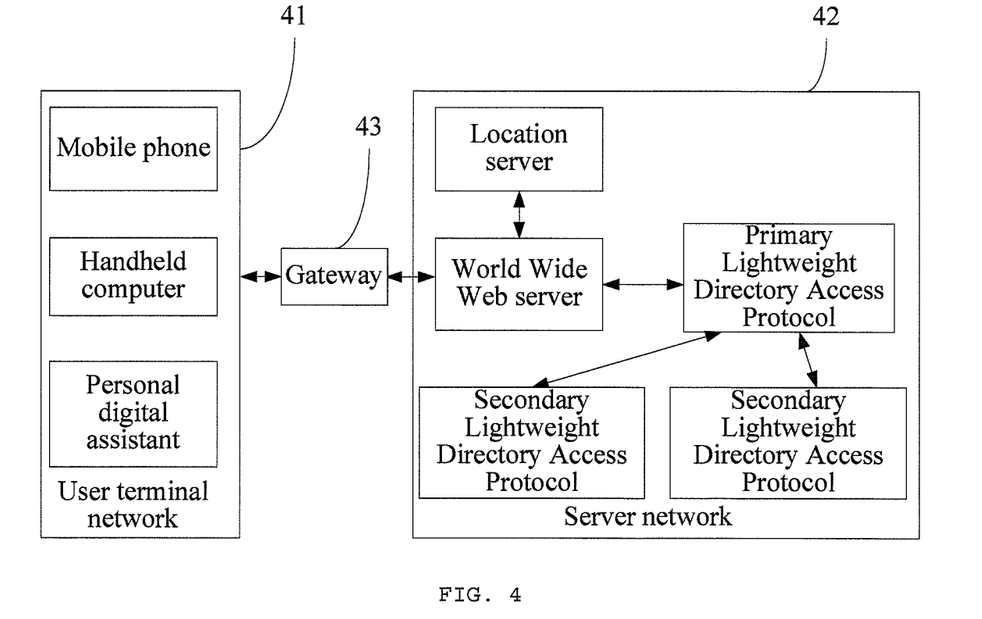
FIG. 4 is a schematic structural diagram of an apparatus where the help-seeking method based on the location based service according to the still another embodiment of the present invention is applied.

The above steps are an application of the location based service. The structure of the apparatus is shown in FIG. 4. The first terminal and the second terminal constitute a user terminal network 41, including a mobile phone, a PDA, and a handheld computer. The server is located in a server network 42, including a location server, a Web server and an LDAP server, where the LDAP server is constituted by a primary LDAP server and a secondary LDAP server. The user terminal network 41 interacts with the server network 42 through a gateway 43.

Figure 5:
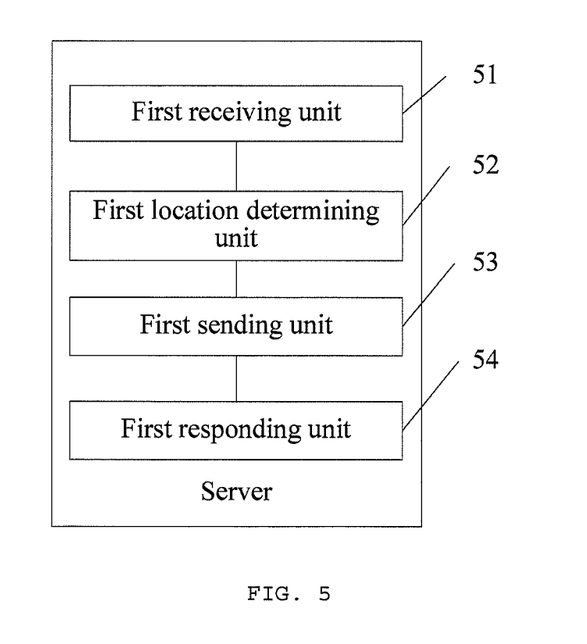
FIG. 5 is a schematic structural diagram 1 of a server according to an embodiment of the present invention.

As shown in FIG. 5, an embodiment of the present invention provides a server, including:

a first receiving unit 51, configured to receive help-seeking information sent by a first terminal, where the specific implementation mode can be seen in step 101 in FIG. 1, and is not described here again;

a first location determining unit 52, configured to determine a location area of the first terminal according to the help-seeking information sent by the first terminal, where the specific implementation mode can be seen in step 101 in FIG. 1, and is not described here again;

a first sending unit 53, configured to send the help-seeking information sent by the first terminal to a second terminal located in the same location area as the first terminal, where the specific implementation mode can be seen in step 102 in FIG. 1, and is not described here again; and a first responding unit 54, configured to receive response information corresponding to the help-seeking information and fed back by the second terminal, and send the response information fed back by the second terminal to the first terminal, where the specific implementation mode can be seen in step 103 in FIG. 1, and is not described here again.

Figure 6:
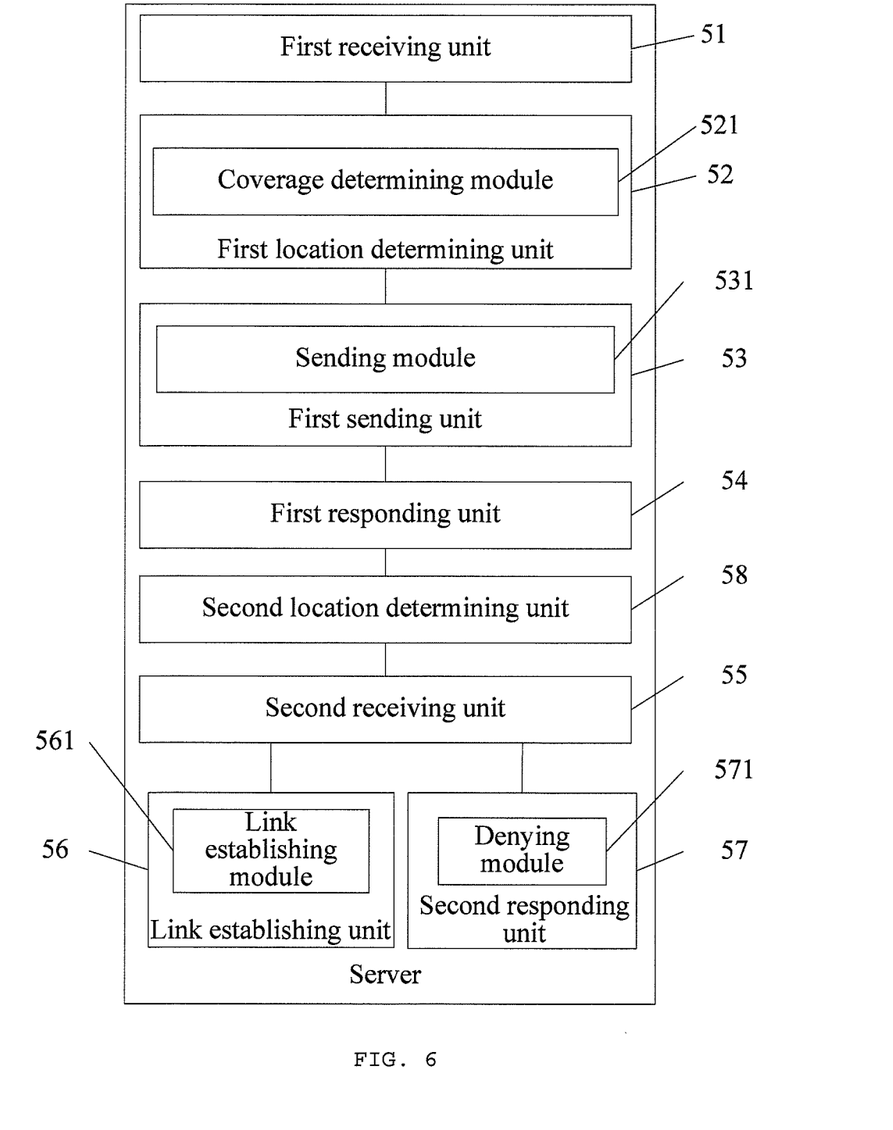
FIG. 6 is a schematic structural diagram 2 of a server according to an embodiment of the present invention.

Further, as shown in FIG. 6, the first location determining unit 52 includes:

a coverage determining module 521, configured to determine the coverage of a base station in the location area of the first terminal according to the type of the help-seeking information, where the specific implementation mode can be seen in step 302 in FIG. 3, and is not described here again.

Further, as shown in FIG. 6, the first sending unit 53 includes:

a sending module 531, configured to send the help-seeking information sent by the first terminal to the second terminal located in the coverage of the same base station as the first terminal, where the specific implementation mode can be seen in step 302 in FIG. 3, and is not described here again.

Further, as shown in FIG. 6, the server further includes:

a second receiving unit 55, configured to receive an operation request sent by the first terminal and corresponding to the response information fed back by the second terminal, where the specific implementation mode can be seen in step 305 in FIG. 3, and is not described here again;

a link establishing unit 56, configured to establish an instant communication link between the first terminal and the second terminal according to the operation request of the first terminal, where the specific implementation mode can be seen in step 306 in FIG. 3, and is not described here again; and a second responding unit 57, configured to send, according to the operation request of the first terminal, a response message indicating successful help acquisition for the help-seeking of the first terminal to the second terminal not selected by the first terminal, where the specific implementation mode can be seen in step 305 in FIG. 3, and is not described here again.

Further, as shown in FIG. 6, the server further includes:

a second location determining unit 58, configured to determine geographic location information of the second terminal according to the response information fed back by the second terminal, and send the geographic location information of the second terminal to the first terminal, where the specific implementation mode can be seen in step 303 to step 304 in FIG. 3, and is not described here again.

The operation request sent by the first terminal and corresponding to the response information fed back by the second terminal includes selection information of the second terminal used for further help acquisition and selected by the first terminal according to the geographic location information of the second terminal, and deny information corresponding to the second terminal not selected by the first terminal.

Further, as shown in FIG. 6, the link establishing unit 56 includes:

a link establishing module 561, configured to establish, according to the selection information of the second terminal, the instant communication link between the first terminal and the second terminal selected by the first terminal, where the specific implementation mode can be seen in step 306 in FIG. 3, and is not described here again.

Further, as shown in FIG. 6, the second responding unit 57 includes:

a denying module 571, configured to send, according to the deny information, the response message indicating successful help acquisition for the help-seeking of the first terminal to the second terminal not selected by the first terminal, where the specific implementation mode can be seen in step 305 in FIG. 3, and is not described here again.

Further, as shown in FIG. 6, the first sending unit 53 is specifically further configured to send, according to a preset help-seeking range criterion, the help-seeking information of the first terminal to the second terminal satisfying the help-seeking range criterion, where the second terminal is located in the same location area as the first terminal, and the help-seeking range criterion is preset in a help-seeking server or is contained in the help-seeking information of the first terminal. The specific implementation mode can be seen in step 302 in FIG. 3, and is not described here again.

According to the server provided in the embodiment of the present invention, the first receiving unit receives help-seeking information sent by a first terminal, the first location determining unit determines a location area of the first terminal, and the first sending unit sends the help-seeking information to a second terminal located in the same location area as the first terminal. In this way, the help-seeking information sent by the first terminal can be published in time. Compared with the prior art, the embodiment of the present invention is capable of solving the problem that help-seeking information cannot be published in time when a user terminal needs help from another user terminal in the neighborhood of the user terminal in terms of geographic location.

Figure 7:
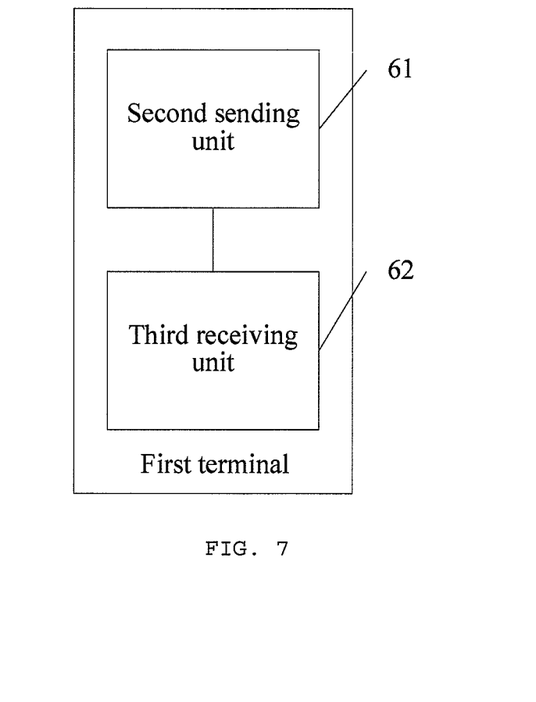
FIG. 7 is a schematic structural diagram 1 of a first terminal according to an embodiment of the present invention.

As shown in FIG. 7, an embodiment of the present invention provides a first terminal, including:

a second sending unit 61, configured to send help-seeking information to a server, where the specific implementation mode can be seen in step 201 in FIG. 2, and is not described here again; and a third receiving unit 62, configured to, after a second terminal feeds back response information corresponding to the help-seeking information to the server, receive the response information fed back by the second terminal and sent by the server, where the specific implementation mode can be seen in step 202 in FIG. 2, and is not described here again.

Figure 8:
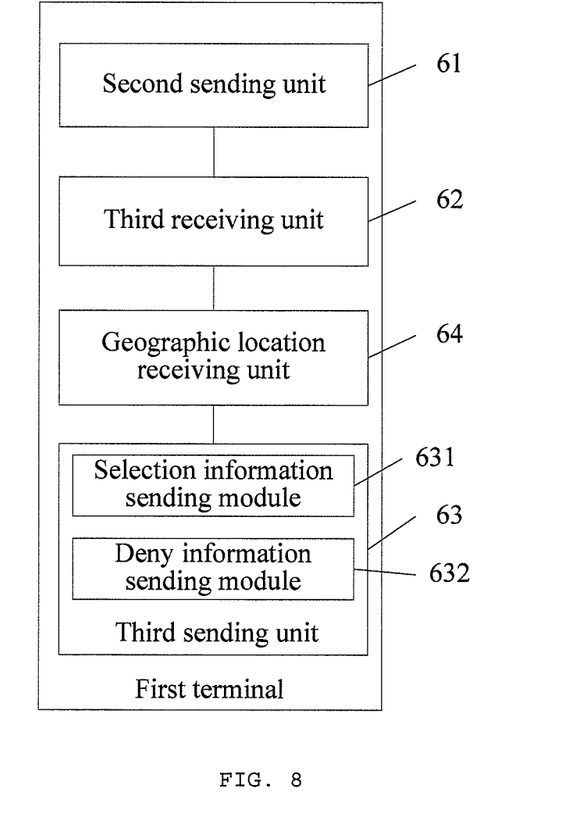
FIG. 8 is a schematic structural diagram 2 of a first terminal according to an embodiment of the present invention.

Further, as shown in FIG. 8, the first terminal further includes:

a third sending unit 63, configured to send an operation request corresponding to the response information fed back by the second terminal to the server, where the specific implementation mode can be seen in step 305 in FIG. 3, and is not described here again.

Further, as shown in FIG. 8, the first terminal further includes:

a geographic location receiving unit 64, configured to, after the server determines geographic location information of the second terminal according to the response information fed back by the second terminal, receive the geographic location information of the second terminal sent by the server, where the specific implementation mode can be seen in step 303 to step 304 in FIG. 3, and is not described here again.

Further, as shown in FIG. 8, the third sending unit 63 includes:

a selection information sending module 631, configured to select the second terminal according to the geographic location information of the second terminal, and send selection information of the second terminal used for further help acquisition to the server, where the specific implementation mode can be seen in step 305 in FIG. 3, and is not described here again; and a deny information sending module 632, configured to deny the second terminal according to the geographic location information of the second terminal, and send deny information corresponding to the second terminal not selected by the first terminal to the server, where the specific implementation mode can be seen in step 305 in FIG. 3, and is not described here again.

According to the first terminal provided in the embodiment of the present invention, the second sending unit sends help-seeking information to a server; and after the second terminal feeds back response information corresponding to the help-seeking information to the server, the third sending unit receives the response information. In this way, the help-seeking information sent by the first terminal can be published in time and a response and help can be obtained from the second terminal. Compared with the prior art, the embodiment of the present invention is capable of solving the problem that help-seeking information cannot be published in time when a user terminal needs help from another user terminal in the neighborhood of the user terminal in terms of geographic location.

Figure 9:
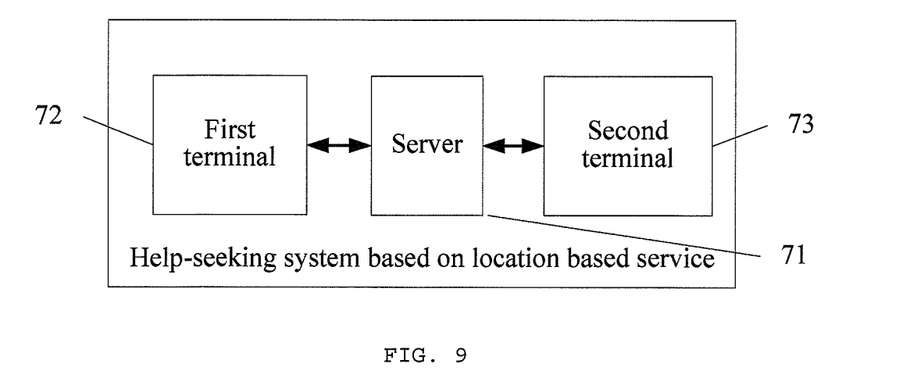
FIG. 9 is a schematic structural diagram of a help-seeking system based on a location based service according to an embodiment of the present invention.

As shown in FIG. 9, an embodiment of the present invention provides a help-seeking system based on a location based service, including the server 71, the first terminal 72 and the second terminal 73.

The server 71 is configured to receive help-seeking information sent by the first terminal 72, and determine a location area of the first terminal 72 according to the help-seeking information sent by the first terminal 72; send the help-seeking information sent by the first terminal 72 to the second terminal 73 located in the same location area as the first terminal 72; and receive response information corresponding to the help-seeking information and fed back by the second terminal 73, and send the response information fed back by the second terminal 73 to the first terminal 72.

The first terminal 72 is configured to send the help-seeking information to the server 71; and after the second terminal 73 feeds back the response information corresponding to the help-seeking information to the server 71, receive the response information fed back by the second terminal 73 and sent by the server 71.

The specific implementation mode can be seen in the specific embodiments of the server and the first terminal, and is not described here again.

According to the help-seeking system based on the location based service provided in the embodiment of the present invention, the server receives help-seeking information of the first terminal, determines a location area of the first terminal according to the help-seeking information, and sends the help-seeking information to the second terminal located in the same location area as the first terminal. In this way, the help-seeking information sent by the first terminal can be published in time. Compared with the prior art, the embodiment of the present invention is capable of solving the problem that help-seeking information cannot be published in time when a user terminal needs help from another user terminal in the neighborhood of the user terminal in terms of geographic location.

Through the above description of the embodiments, it is clear to persons skilled in the art that the present invention may be accomplished by software plus necessary universal hardware, and definitely may also be accomplished by hardware, but in many cases, the software implementation is preferred. Based on this, the technical solutions of the present invention or the part that makes contributions to the prior art can be substantially embodied in the form of a software product. The computer software product is stored in a readable storage medium, for example, a floppy disk, hard disk, or optical disk of the computer, and contains several instructions used to instruct a computer device (for example, a personal computer, a server, or a network device) to perform the methods according to the embodiments of the present invention.

The foregoing descriptions are merely exemplary embodiments of the present invention, but not intended to limit the protection scope of the present invention. Any variation or replacement made by persons skilled in the art within the technical scope disclosed by the present invention shall fall within the protection scope of the present invention. Therefore, the protection scope of the present invention shall be subject to the appended claims.

What is claimed is:

1. A help-seeking method based on a location based service, the method comprising:
   receiving help-seeking information sent by a first terminal, and determining a location area of the first terminal according to the help-seeking information sent by the first terminal;
   sending the help-seeking information sent by the first terminal to a plurality of second terminals located in the same location area as the first terminal;
   receiving response information corresponding to the help-seeking information and fed back by the plurality of second terminals, and sending the response information fed back by the plurality of second terminals to the first terminal;
   determining geographic location information of the plurality of second terminals according to the response information fed back by the plurality of second terminals;
   sending the geographic location information of the plurality of second terminals to the first terminal;
   receiving an operation request sent by the first terminal and corresponding to the response information fed back by the plurality of second terminals, the operation request comprising:
      selection information of one of the plurality of second terminals selected by the first terminal according to geographic location information of the selected second terminal, and
      deny information corresponding to another one of the plurality of second terminals not selected by the first terminal; and
   establishing an instant communication link between the first terminal and the selected second terminal according to the operation request of the first terminal or sending a response message indicating successful help acquisition for the help-seeking of the first terminal to the other one of the plurality of second terminals according to the deny information in the operation request of the first terminal.

2. The help-seeking method according to claim 1, wherein determining the location area of the first terminal according to the help-seeking information sent by the first terminal comprises:
   determining coverage of a base station in the location area of the first terminal according to a type of the help-seeking information; and
   wherein sending the help-seeking information sent by the first terminal to the second terminal located in the same location area as the first terminal comprises:
      sending the help-seeking information sent by the first terminal to the second terminal located in the coverage of the same base station as the first terminal.

3. The help-seeking method according to claim 1, wherein sending the help-seeking information sent by the first terminal to the plurality of second terminals located in the same location area as the first terminal comprises: sending, according to a preset help-seeking range criterion, the help-seeking information of the first terminal to the plurality of second terminals satisfying the help-seeking range criterion, wherein the plurality of second terminals is located in the same location area as the first terminal, and the help-seeking range criterion is preset in a help-seeking server or is contained in the help-seeking information of the first terminal.

4. The help-seeking method according to claim 3, wherein the preset help-seeking range criterion is a preset distance, a preset group, or a preset distance and a preset group.

5. A help-seeking method based on a location based service, the method comprising:
   sending help-seeking information to a server so that the server determines a location area of a first terminal according to the help-seeking information and sends the help-seeking information to a plurality of second terminals located in the same location area as the first terminal;
   after the plurality of second terminals feeds back response information corresponding to the help-seeking information to the server, receiving the response information fed back by the plurality of second terminals and sent by the server;

after the server determines geographic location information of the plurality of second terminals according to the response information fed back by the plurality of second terminals, receiving the geographic location information of the plurality of second terminals sent by the server;

sending an operation request corresponding to the response infoiiiation fed back by the plurality of second terminals to the server so that the server establishes a communication link between the first terminal and a one of the plurality of second terminals according to the operation request, or sends a response message indicating successful help acquisition for the help-seeking of the first terminal to another one of the plurality of second terminals according to the operation request; and wherein sending the operation request corresponding to the response information fed back by the plurality of second terminals to the server comprises:

selecting one of the plurality of second terminals according to the geographic location information of the selected second terminal, and sending selection information of the selected second terminal used for further help acquisition to the server, and denying the other one of the plurality of second terminals according to the geographic location information of the other one of the plurality of second terminals, and sending deny information corresponding to the other one of the plurality of second terminals not selected by the first terminal to the server.

6. The help-seeking method according to claim 5, wherein sending the help-seeking information to the server so that the server determines the location area of the first terminal according to the help-seeking information and sends the help-seeking information to the plurality of second terminals located in the same location area as the first terminal comprises:

sending the help-seeking information to the server so that the server sends, according to a preset help-seeking range criterion, the help-seeking information to the plurality of second terminals satisfying the help-seeking range criterion, wherein the plurality of second terminals is located in the same location area as the first terminal, and the help-seeking range criterion is preset in a help-seeking server or is contained in the help-seeking information.

7. The help-seeking method according to claim 6, wherein the preset help-seeking range criterion is a preset distance, a preset group, or a preset distance and a preset group.

8. A server, comprising:
a first receiving unit, configured to receive help-seeking information sent by a first terminal;
a first location determining unit, configured to determine a location area of the first terminal according to the help-seeking information sent by the first terminal;
a first sending unit, configured to send the help-seeking information sent by the first terminal to a plurality of second terminals located in the same location area as the first terminal;
a first responding unit, configured to receive response information corresponding to the help-seeking information and fed back by the plurality of second terminals, and send the response information fed back by the plurality of second terminals to the first terminal;
a second location determining unit, configured to determine geographic location information of the plurality of second terminals according to the response information fed back by the plurality of second terminals, and send the geographic location information of the plurality of second terminals to the first terminal;

a second receiving unit, configured to receive an operation request sent by the first terminal and corresponding to the response information fed back by the plurality of second terminals, wherein the operation request sent by the first terminal and corresponding to the response information fed back by the plurality of second terminals comprises:

selection information of one of the plurality of second terminals selected by the first terminal according to the geographic location information of the selected second terminal, and deny information corresponding to another one of the plurality of second terminals not selected by the first terminal;

a link establishing unit, configured to establish an instant communication link between the first terminal and the selected second terminal according to the operation request of the first terminal, or a second responding unit, configured to send a response message indicating successful help acquisition for the help-seeking of the first terminal to the other one of the plurality of second terminals according to the operation request of the first terminal.

9. The server according to claim 8, wherein:
the first location determining unit comprises:
a coverage determining module, configured to determine coverage of a base station in the location area of the first terminal according to a type of the help-seeking information; and the first sending unit comprises:
a sending module, configured to send the help-seeking information sent by the first terminal to the second terminal located in the coverage of the same base station as the first terminal.

10. The server according to claim 8, wherein
the first sending unit is further configured to send, according to a preset help-seeking range criterion, the help-seeking information of the first terminal to the plurality of second terminals satisfying the help-seeking range criterion, wherein the plurality of second terminals is located in the same location area as the first terminal, and the help-seeking range criterion is preset in a help-seeking server or is contained in the help-seeking information of the first terminal.

11. A first terminal, comprising:
a second sending unit, configured to send help-seeking information to a server;
a third receiving unit, configured to, after a plurality of second terminals feeds back response information corresponding to the help-seeking information to the server, receive the response information fed back by the plurality of second terminals and sent by the server;
a geographic location receiving unit, configured to, after the server determines geographic location information of the plurality of second terminals according to the response information fed back by the plurality of second terminals, receive the geographic location information of the plurality of second terminals sent by the server,
a third sending unit, configured to send an operation request corresponding to the response information fed back by the plurality of second terminals to the server;
wherein the third sending unit comprises:
a selection information sending module, configured to select a one of the plurality of second terminals according to the geographic location information of the plurality of second terminals, and send selection information of the selected second terminal used for further help acquisition to the server; and a deny information sending module, configured to deny another one of the plurality of second terminals according to the geographic location information of the other one of the plurality of second terminals, and send deny information corresponding to the other one of the plurality of second terminals not selected by the first terminal to the server.

* * * * *